United States Patent [19]

Indo

[11] Patent Number: 4,672,317
[45] Date of Patent: Jun. 9, 1987

[54] MULTI-GAP HEAD APPARATUS FOR USE WITH A MAGNETIC SCALE

[75] Inventor: Kenji Indo, Hadano, Japan

[73] Assignee: Sokkishia Co., Ltd., Tokyo, Japan

[21] Appl. No.: 761,604

[22] Filed: Aug. 1, 1985

[30] Foreign Application Priority Data

Aug. 30, 1984 [JP] Japan ............................ 59-181036

[51] Int. Cl.⁴ .................... G01B 7/02; G01B 5/147; G01R 33/00
[52] U.S. Cl. ............................ 324/208; 235/449; 324/225; 324/260; 360/121; 360/126
[58] Field of Search ............... 324/206, 207, 208, 225, 324/244, 260; 360/120, 121, 126; 235/449, 493; 33/DIG. 1

[56] References Cited

U.S. PATENT DOCUMENTS

| | | | |
|---|---|---|---|
| 2,807,676 | 9/1957 | Lynn | 360/126 |
| 4,589,038 | 5/1986 | Radtke | 324/206 |
| 4,603,365 | 7/1986 | Nakamura | 324/225 X |

FOREIGN PATENT DOCUMENTS

| | | |
|---|---|---|
| 2912309 | 10/1979 | Fed. Rep. of Germany . |
| 3308404 | 9/1983 | Fed. Rep. of Germany . |
| 3325353 | 1/1985 | Fed. Rep. of Germany . |
| 0159108 | 12/1980 | Japan .................... 324/208 |
| 2016144 | 9/1979 | United Kingdom . |

Primary Examiner—Gerard R. Strecker
Attorney, Agent, or Firm—Frishauf, Holtz, Goodman & Woodward

[57] ABSTRACT

A multi-gap head apparatus employed in a measuring system using a magnetic scale. First and second thin plates, making up core members, are stamped out with a selected width near the center portion of alternately stacked first rolled plates and second rolled plates made of a highly permeable material and a non-magnetic material, respectively. A compensator plate is interposed between the core members in order to compensate for output distortion due to a thickness error of the first and second thin plates.

1 Claim, 5 Drawing Figures

MULTI-GAP HEAD APPARATUS FOR USE WITH A MAGNETIC SCALE

BACKGROUND OF THE INVENTION

This invention relates to a measuring system employing a magnetic scale, and more particularly to an improvement of a multi-gap head for use with the magnetic scale for sensing the magnetization patterns thereof and changing them into electric signals.

As is known, the measuring system for measuring a length, angle and so forth, by using a magnetic scale, has been employed in various fields because of its high degree of accuracy, and it has widely been applied in the field of automatic control systems recently. Such a measuring system includes a magnetic scale having magnetization patterns formed with a fixed pitch thereon and a magnetic head disposed in an opposed relation to the magnetic scale. Either the scale or the head is fixed, and the other is attached to an object, the displacement of which is to be measured. The length of travel of the object is measured by electrically processing the signals which are produced by the magnetic head when the object moves.

The measuring system, however, necessitates meeting the following requirements. Measurement should be possible even if the relative velocity between the scale and the head is not constant and the object remains static. Further, the pressure between the scale and the head should not be great, so as to prevent wear thereof.

A magnetic flux sensing type head is used in order to meet the above requirements. The exciting core of the magnetic flux sensing type head has an exciting winding and a signal winding. High frequency exciting current is supplied to the exciting winding. The signals are obtained from the signal winding when the exciting current is modulated by the magnetization patterns of the scale. In this case, a multi-gap type core has been recently used as the exciting core in order to obtain high accuracy and high output. The exciting core of the multi-gap type core comprises a plurality of thin plates made of a high permeability material such as permalloy, and thin plates made of a non-magnetic material such as beryllium copper. The two kinds of plates are stacked alternately to make a core member in which the plates made of the high permeability material may be disposed with fixed gaps therebetween. The thickness of the core corresponds with the pitch $\lambda$ of the magnetization patterns formed on the magnetic scale. The exciting core has two cores having n core members, and the cores are so disposed that the gap therebetween may become $n\lambda \pm (\frac{1}{4})\lambda$.

In the above-mentioned multi-gap head, the gap between each plate made of the high permeability material needs to be restrictively determined because the gap is microscopic and affects the intrinsic wave length of the head.

Therefore, in the prior art, the gaps between the plates made of a high permeability material is kept at a fixed value by so restrictively determining the thickness of both plates made of a high permeability material and those made of a non-magnetic material within a fixed range. For example, in the case that the gap between the plates made of high permeability material is determined as 100 $\mu$ms, the thickness of the plates both made of high permeability material and of non-magnetic material is accurately determined as 50 $\mu$ms.

The manufacture of the multi-gap head, therefore, requires much trouble. For example, the thickness of the plates should be controlled with care and the work for piling the plates should also proceed with care. Particularly, the thin plates are gained by stamping out the rolled plates made of high permeability and non-magnetic materials. For example, when plates with a thickness of 50 $\mu$ms are made, the plates are produced with a thickness error within $\pm 5$ $\mu$ms, and a thickness error within $\pm 2$ $\mu$ms occurs even if the materials are well rolled. As a result, for example, in the case that the core member is composed of m plates with the thickness error within $\pm 5$ $\mu$ms, the dimensional error of the core within $\pm 5$ $\mu$ms results therefrom.

SUMMARY OF THE INVENTION

It is an object of the present invention to provide a multi-gap head apparatus for use with a magnetic scale to produce a desirable output. The thin plates composing the core members are obtained by stamping out a selected portion, with a selected width, near the center of rolled plates made both of a high permeability material and of a non-magnetic material. Furthermore, the thickness error of the thin plates composing n core members making up a core, is decreased by interposing a compensator plate for compensating output distortion due to the thickness error of the thin plates.

It is another object of the invention to provide a multi-gap head apparatus for use with a magnetic scale producing a desirable output wherein by interposing a second compensator plate between a plurality of cores the thickness error of each is compensated for by the second compensator plate, the gap between the cores is so compensated that the gap may become $\lambda/4$.

According to one embodiment of the present invention, there is provided a multi-gap head apparatus for use with an opposed magnetic scale and made movable relative to the magnetic scale on which magnetization patterns of a fixed wave length $\lambda$ are formed, comprising a core composed of n core members each of which includes first thin rolled plates made of either a high permeability material and a non-magnetic material. The thin plates are piled up alternately so that there may be a fixed gap between the first thin plates. The multi-gap head apparatus for use with a magnetic scale is characterized in that the first and second thin plates are obtained by stamping out a selected portion, with a selected width, near the center of both rolled plates made of a high permeability material and a non-magnetic material, and that a compensator plate for compensating the output distortion due to the thickness error of the first and second thin plates is interposed between the core members composing a core.

DETAILED DESCRIPTION OF THE PREFERRED EMBODIMENTS

Figure 1A:
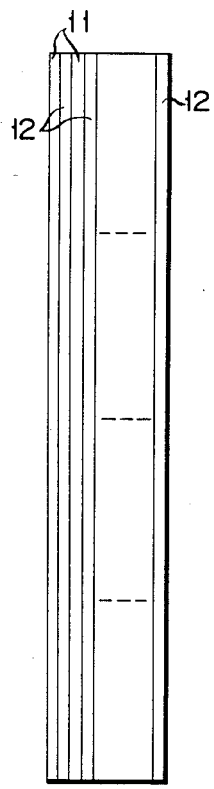
FIGS. 1A and 1B are a side view and a top view respectively to explain a way for stamping out thin plates composing a core member from both rolled plates made of a high permeability material and a non-magnetic material.

Referring to FIG. 1A, first rolled plates 11 are made of a high permeability material such as permalloy. Second rolled plates 12 are made of a non-magnetic material such as beryllium or copper. A plurality of the first plates 11 and second plates 12 are alternately piled up.

Where each of the plates 11 and 12 has a thickness of 50 μms, an error in the thickness within ±5 μms occurs as aforementioned. The inventors have found that there is a large difference between the thickness error of the central portion of the rolled plate and that of the end portion thereof but that the thickness error at a selected central portion within a selected width (for example, 10 mm wide) falls within ±1 μm.

Figure 1B:
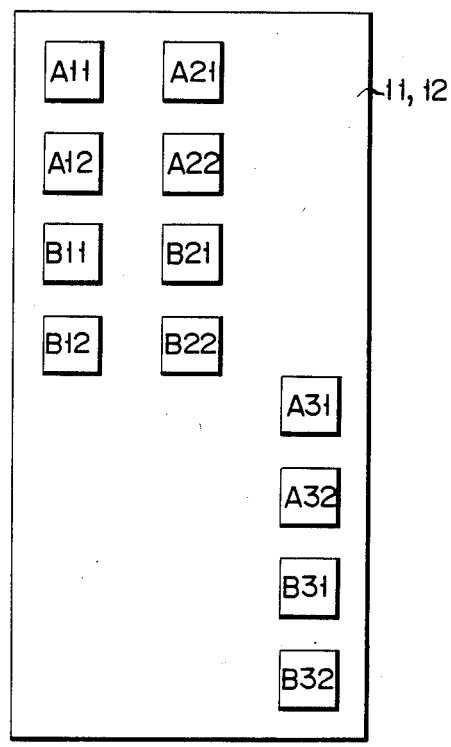
Figure 3:
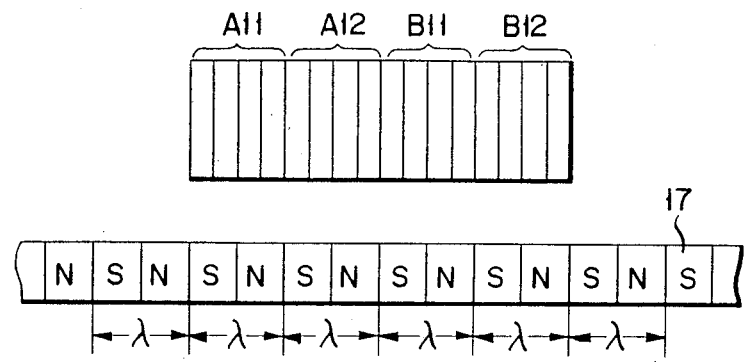
FIG. 3 is a side view which shows a relationship between a magnetic scale and a core in the case that the core has no error in the thickness of the plates.

In the present invention, therefore, a plurality of first rolled plates and of second rolled plates necessary for composing core members of a multi-gap head means, are alternately piled up as shown in FIG. 1A. Then, as shown in FIG. 1B, four core members A11, A12, B11 and B12 to compose one core are gained by stamping out a selected central portion, with a selected width, of the first and second rolled plates. FIG. 3 illustrates a way to stamp out three sets of core members A11, A12, B11, B12, and A21, A22, B21, B22, and A31, A32, B31, B32 to provide three cores.

A core composed of the core members A11, A12, B11 and B12 will hereinafter be described. The core members are integrally stacked so that the thickness error of each thin plate composing the core members A11, A12, B11 and B12 falls within ±1 μm as aforementioned thus providing a core with more accurate dimensional tolerance.

Figure 2:
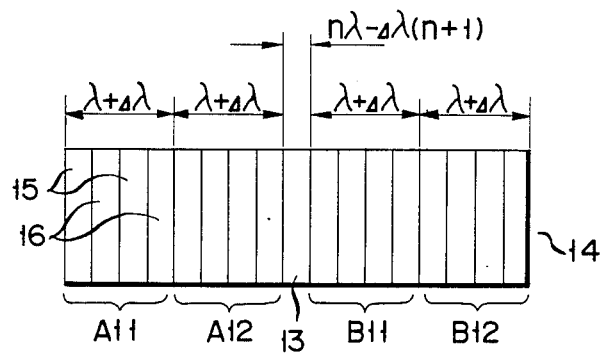
FIG. 2 is a side view of a core in which a compensator plate is interposed.

According to the above described method, however, it is impossible to completely dissolve the thickness error of each plate composing the core members A11, A12, B11 and B12. The present invention provides an improvement as shown in FIG. 2. A first compensator plate 13 is interposed between the core members A12 and B11 and thereby the output distortion due to a dimensional error of the core 14 is compensated. As shown in FIG. 2, a first thin plate 15 is stamped out of the first rolled plate 11, and second thin plate 16 is stamped out of the second rolled plate 12.

Before describing the compensator plate 13, the relation between the core members A11, A12, B11 and B12 and the magnetic scale in the case that there is no thickness error of the thin plates composing the core members will hereinafter be explained. Magnetic patterns are formed on a magnetic scale means 17 (FIG. 3) with fixed pitch λ (for example 200 μms). The dimension of each of the core members A11, A12, B11 and B12 corresponds with the pitch λ, that is, each of the core members A11, A12, B11 and B12 is composed of four thin plates 15 and 16 where the pitch λ is 200 μms and each thin plate composing the core members A11, A12, B11 and B12 is 50 μm thick.

Returning to FIG. 2, when the dimensional error which occurs as the result of stacking four thin plates 15 and 16 is denoted as $\Delta\lambda$, each dimension of the core members A11, A12, B11 and B12 is denoted as $\lambda + \Delta\lambda$. Where a core composed of n core members each made up of four thin plates 15 and 16 travels along the magnetic scale means, the output P gained from the core is denoted as follows:

$$P = K \sin(\theta + \Delta\lambda) + K \sin(\theta + 2\Delta\lambda) + \ldots + K \sin(\theta + n\Delta\lambda) \quad (1)$$

where
 k is a constant,
 $\lambda = (2\pi/\lambda)X$,
 x is the length of travel, and
 $\Delta\lambda$ is the dimensional error of four thin plates.

The above equation (1) is decomposed as follows:

$$P = K\{\sin\theta(\cos\Delta\lambda + \cos 2\Delta\lambda + \ldots + \cos n\Delta\lambda) + \cos\theta(\sin\Delta\lambda + \sin 2\Delta\lambda + \ldots + \sin n\Delta\lambda)\} \quad (2)$$

In the above equation (2), the necessary output is represented by the first half term and the second half term represents the error.

The compensator plate 13 is disposed between the core members as shown in FIG. 2. The thickness of the compensator plate 13 is represented as $n\lambda - \Delta\lambda(n+1)$. As the result of interposing the compensator plate 13, the output P gained from the core composed of n core members each made up of four thin plates 15 and 16 is as follows:

$$P = K \sin(\theta + \Delta\lambda) + K \sin(\theta + 2\Delta\lambda) + \ldots$$

$$+ K \sin\{\theta + (n/2)\Delta\lambda\} + K \sin\{\theta - (n/2)\Delta\lambda\} + \ldots$$

$$+ K \sin(\theta - 2\Delta\lambda) + K \sin(\theta - \Delta\lambda)$$

$$= K [\sin\theta\{\cos\Delta\lambda + \cos 2\Delta\lambda + \ldots$$

$$+ \cos(n/2 \cdot \Delta\lambda) + \cos(-n/2 \cdot \Delta\lambda) + \ldots$$

$$+ \cos(-2\Delta\lambda) + \cos(-\Delta\lambda)\}$$

$$+ \cos\theta\{\sin\Delta\lambda + \sin 2\Delta\lambda + \ldots$$

$$+ \sin(n/2 \cdot \Delta\lambda) + \sin(-n/2 \cdot \Delta\lambda) + \ldots$$

$$+ \sin(-2\Delta\lambda) + \sin(-\Delta\lambda)\}]$$

Thus the value of the second term of the equation (2) becomes zero.

According to the construction described above, the first and second thin plates of each of a number of, for example four, core members composing one core are obtained by stamping out a selected central portion with a selected width of the first and second rolled plates, whereby the dimensional error of the core due to the thickness error of the first and second thin plates can be decreased. Further, as the distortion of output P gained from the core is compensated by interposing the compensator plate 13 between the core members A12 and B11, a sinusoidal output with no distortion can be gained from the core 14 and thereby an accurate measurement can be provided.

Figure 4:
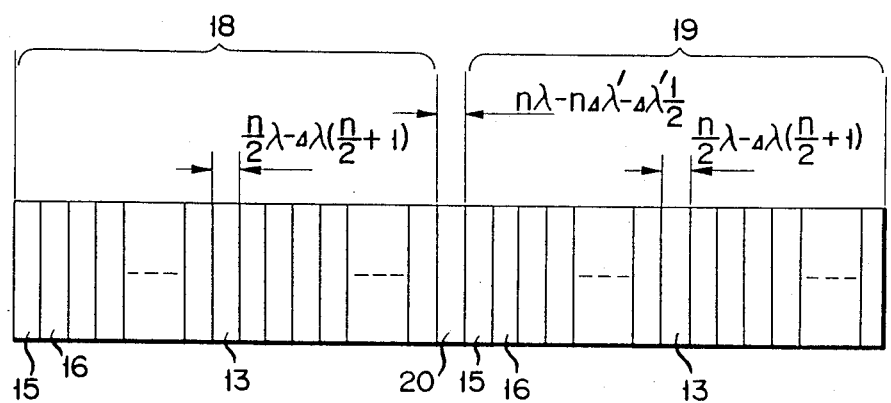
FIG. 4 is a side view in which a second compensator plate is interposed between two cores.

FIG. 4 shows an exciting core comprising a core 18 composed of n/2 sets of four thin plates 15 and 16 with a compensator plate 13 and a core 19 composed in the same manner as the core 18, both of which are so connected that the gap between the cores 18 and 19 may become $\lambda/4$. In this construction, the dimension of the exciting core is denoted as $n\lambda + (\frac{1}{4})\lambda$, should there be no thickness error of the first and second thin plates 15 and 16. When the dimensional error of the above-mentioned exciting core is denoted as $\Delta\lambda'$, the error $\Delta\lambda'$ can be compensated by interposing between the cores 18 and 19 a second compensator plate 20 which has a thickness denoted as $n\lambda - n\Delta\lambda' - \Delta\lambda'(\frac{1}{2})$.

What is claimed is

1. Multi-gap head apparatus for use with opposed magnetic scale means having magnetization patterns of a certain wavelength $\lambda$, and movable relative to said magnetic scale means, the apparatus being of the type having a core comprised of n core members each corresponding to the wavelength $\lambda$ of said magnetization patterns and comprised of a plurality of first thin rolled plates made of a high permeable material and of second thin rolled plates made of a non-magnetic material, the first and the second thin plates being stacked alternately so that a fixed gap is provided between successive ones of said first plates, comprising:

first thin plates and second thin plates stamped out together with a selected width near a center portion of the alternately stacked first and second thin rolled plates to form each of the core members, said first and said second thin plates having a certain range of thickness error;

a pair of first compensator plates one of which is interposed medially within a first group of n/2 core members and the other of which is interposed medially within a second group of n/2 core members different from and aligned with said first group, said first compensator plates being dimensioned to compensate output distortion due to the thickness error of said first and said second thin plates which form said core members;

wherein each of said pair of first compensator plates has a thickness denoted as $n\lambda - \Delta\lambda(n+1)$ wherein $\Delta\lambda$ represents the sum of the thickness error of those first and second thin plates which form the group of core members within which the compensator plate is interposed; and a second compensator plate interposed between said first and said second groups of n/2 core members, said second compensator plate being dimensioned so that the gap between the first and the second groups of core members is maintained at $\lambda/4$;

wherein said second compensator plate has a thickness denoted as $n\lambda - n\Delta\lambda' - \Delta\lambda'(\frac{1}{2})$ to compensate for an error in the gap between the first and second groups of core members when the sum of the thickness error of said first and said second thin plates forming the first and the second groups of core members is represented by $\Delta\lambda'$.

* * * * *

UNITED STATES PATENT AND TRADEMARK OFFICE
CERTIFICATE OF CORRECTION

PATENT NO. : 4,672,317
DATED : June 9, 1987
INVENTOR(S) : K. Indo

It is certified that error appears in the above-identified patent and that said Letters Patent is hereby corrected as shown below:

On the title page assignee should read

--(73) Assignee: Sokkisha Co., Ltd. --.

Signed and Sealed this

Seventh Day of June, 1988

Attest:

DONALD J. QUIGG

*Attesting Officer*  *Commissioner of Patents and Trademarks*